United States Patent [19]

Mattei

[11] Patent Number: 4,943,341

[45] Date of Patent: Jul. 24, 1990

[54] DEVICE WITH CONTRAROTATING KNIVES FOR SEVERING FILTER CIGARETTE UNITING BANDS FROM WEBS IN AUTOMATIC FILTER TIPPING MACHINES

[75] Inventor: Riccardo Mattei, Bologna, Italy

[73] Assignee: G. D. Societa Per Azioni, Bologna, Italy

[21] Appl. No.: 506,711

[22] Filed: Jun. 22, 1983

[30] Foreign Application Priority Data

Jul. 14, 1982 [IT] Italy ................................ 3482 A/82
Mar. 25, 1983 [IT] Italy ................................ 3377 A/83

[51] Int. Cl.[5] ............................................ B32B 31/00

[52] U.S. Cl. ...................................... 156/517; 83/323; 83/341; 156/521; 156/556; 156/567

[58] Field of Search ............... 156/521, 556, 517, 576, 156/568; 83/323, 341, 345

[56] References Cited

U.S. PATENT DOCUMENTS

| | | | |
|---|---|---|---|
| 1,867,884 | 7/1932 | Huff . | |
| 2,246,957 | 6/1941 | Shields | 83/341 |
| 2,399,529 | 4/1946 | Willits | 83/341 |
| 2,829,691 | 4/1958 | Jarvis | 83/341 |
| 3,230,809 | 1/1966 | Liick | 83/341 |
| 3,247,746 | 4/1966 | Nystrand | 83/612 |
| 3,380,328 | 4/1968 | Martin | 83/341 |

FOREIGN PATENT DOCUMENTS

| | | |
|---|---|---|
| 0776777 | 6/1957 | United Kingdom . |
| 0986454 | 3/1965 | United Kingdom . |
| 2066722A | 7/1981 | United Kingdom . |

*Primary Examiner*—Jay H. Woo
*Assistant Examiner*—Timothy W. Heitbrink
*Attorney, Agent, or Firm*—Herbert Dubno

[57] ABSTRACT

A device with contratrotating knives for severing filter cigarette uniting bands from webs for filter cigarette assemblies in automatic filter tipping mahines, in which the knives are carried by drums in arrays with their cutting edges meeting with tangential contact at successive points. The cutting edges of one series of knives are carried at a higher peripheral speed than that of the other series by a support drum. The path of the cutting edges with a higher peripheral speed develops in a plane of the tangential point between the knives of both series such that their lowermost and uppermost sections respectively, are distant from the axis of rotation by equal radii, but greater than that of at least one of their intermediate points coincident with the tangential point.

7 Claims, 6 Drawing Sheets

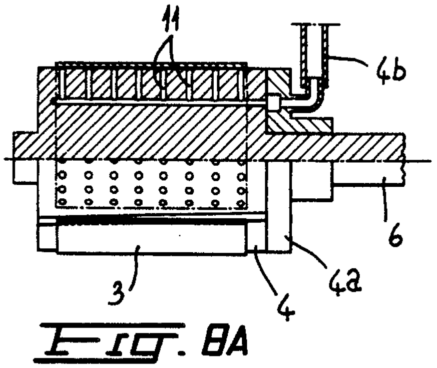
Fig. 8A
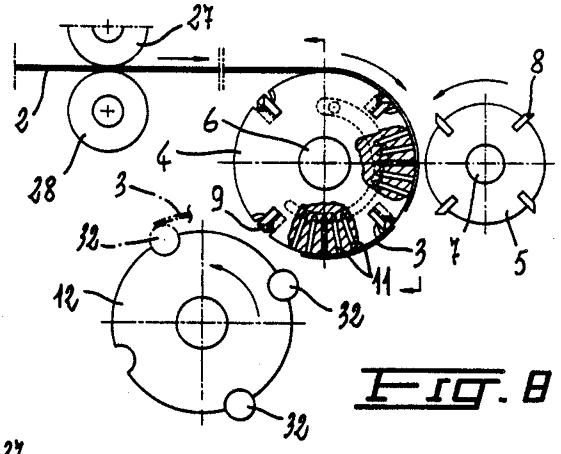
Fig. 8
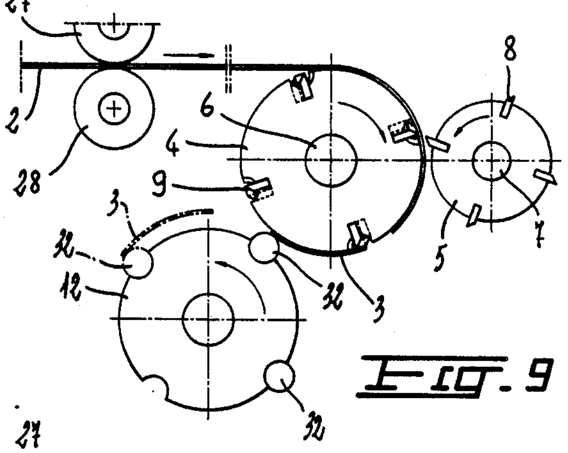
Fig. 9
Fig. 10A
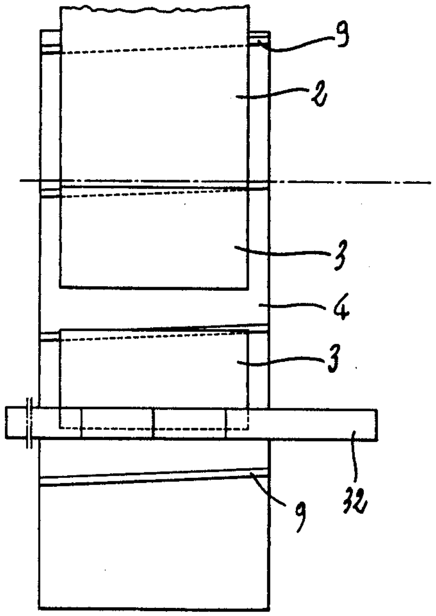
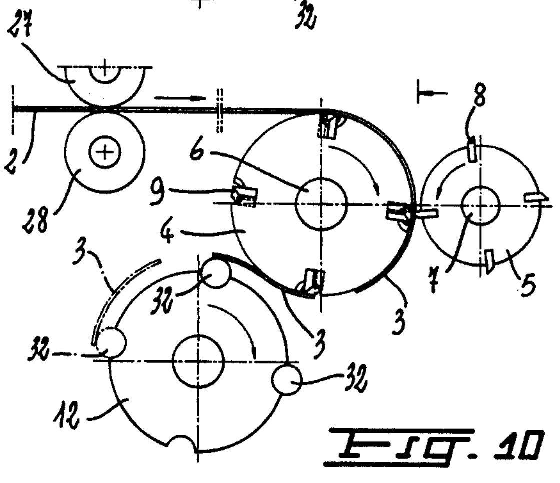
Fig. 10

DEVICE WITH CONTRAROTATING KNIVES FOR SEVERING FILTER CIGARETTE UNITING BANDS FROM WEBS IN AUTOMATIC FILTER TIPPING MACHINES

FIELD OF THE INVENTION

The present invention relates to an improved device with contrarotating knives for severing filter cigarette uniting bands from webs in high speed automatic filter tipping machines.

BACKGROUND OF THE INVENTION

As is known, filter cigarettes are usually manufactured by connecting together, by means of adhesive wrappers, pairs of axially aligned cigarettes, between which is positioned a double length filter plug; the assemblies or units thus obtained are then severed midway of the plug so that each assembly thus yields two filter cigarettes.

The wrappers which join the two cigarette bodies are successively severed or cut in turn from a continuously advanced web of paper material, having imitation cork on one side and coated with adhesive on the other. The cutting device comprises two contrarotating drums with parallel axes and each respectively provided with a plurality of co-operating blade means between which the web is advanced. One of the drums is also provided with means, usually suction means, designed to maintain the non-adhesive side of the web in the feed path between the blades, adhering to its external cylindrical surface in such a manner as to permit the same drum to path beneath the web and keep it adherent to its external surface while entraining it as a function of the feed speed of the same web, both during the feeding operation and during the severing or cutting operation. The drum holds the wrappers steady as they are successively cut from the web in order to space them out and apply them successively thus spaced out tangentially by adhesion of their adhesive surface to the above mentioned cigarette filter units. The latter are conveyed in likewise equidistant rows by a grooved drum provided in contrarotating relationship with the holding drum (see for example GB Patent Nos. 776,777 and 986,454).

Recent developments in these devices with contrarotating severing or cutting means fitted in automatic high speed filter tipping machines, as for example those according to British Patent Application GB 2066722A of 21st Nov. 1980, provide for the severing of the web, by means of knives with cutting edges contrarotating at different peripheral speeds with a grazing, severing or cutting action resulting from severing forces which are essentially radial.

One problem with such knives is that they operate well only at a given temperature. When, because of the heating of one of the knife carrying drums for the recovery of the adhesive coating of the wrappers, the knives are caused to heat up further, they expand radially outwardly; this results in their no longer being able to cut tangentially at successive points with a shearing action or with a striking action. British Patent Application 2066722A, for example, proposes to solve the problem of severing the wrappers in various ways, such as that of severing or cutting by pressure or by conventional tangential contact at successive points of the cutting edges of the knives contrarotating at different peripheral speeds (cutting action by shearing). This arrangement provides a co-operating device with contrarotating knives with a grazing action at successive points of the cutting edge of the higher speed knives against the cutting edge of the lower speed knife. (See also U.S. Pat. No. 3,247,746)

Essentially, then, while severing by means of conventional tangential contact at successive points of the cutting edges at different peripheral speeds, is carried out by a succession of severing or cutting strokes which may be defined as essentially tangential, severing in accordance with recent developments by means of the grazing action proposed in the above mentioned British Patent Application GB 2066722A is carried out rather by a succession of severing or cutting forces which may be defined as essentially radial with a scoring effect.

Applicant has found that the lack of success of such automatic high speed filter tipping machines with knives operating at the respective cutting edges contrarotating at different peripheral speeds with tangential reciprocal contact at successive points is not to be ascribed, as maintained in the Patent Application GB 2,066,722A, to the overheating and consequent radial expansion of the same knives, but rather to the incorrect reciprocation of their operative positions on their respective drums. I have found that if such an incorrect position allows operation at low speeds, it does not allow such good operation at higher speeds, thus causing further problems, such as, for example, the cutting time, this latter being a function of the speed, the operative angle of contrarotation of the knives themselves, between which the said cutting must be carried out, and the position of the said operative angle in relation to the tangential point of the plane traversed by the respective axes of contrarotation of the aforementioned cutting edges.

Above all, this is confirmed by the contents of U.S. Pat. No. 1,867,884 of 18th June 1931, which provides a device of the abovementioned type with knives contrarotating at different peripheral speeds in order to cut from a continuous web of serviettes, handkerchiefs, nappies and similar paper articles, defined at that time (more than fifty years ago) as at high speed, in which the knife at the higher peripheral speed is positioned at the cutting edge or border of the rectilinear path in a plane parallel to the plane traversed by the axis of rotation of the respective support drums and in an oblique or inclined position in the said plane with respect to the said axis in such a way that the marginal edge of the said lowermost rectilinear cutting edge, with respect to the direction of its rotational movement, results in a distance from the said axis corresponding to a smaller radius that that of the distance from the said axis to its other uppermost marginal edge.

With a similar arrangement of the said knife with an inclined rectilinear cutting edge with a higher peripheral speed, the operative cutting angle is, in the majority of cases, displaced completely below or completely above the plane traversed by the axes of contrarotation of the two knife-carrying drums according to the inclination of the said plane with respect to vertical, with a notable projection of the abovementioned upper edge of the said knife over the cylindrical surfaces of the respective drums, in order to be able, with regard to operative contact below or, respectively, above the said plane, to follow the rectilinear cutting edge of the other knife along the corresponding circumferential path of rotation, so that it is absolutely necessary to maintain the said knife with its rectilinear cutting blade inclined in an elastically yielding manner so as to allow the said cutting blade to follow a course according to a helicoidal spiral during the cutting action, even though at a very slow rate.

Another disadvantage of all the cutting devices hitherto known of the type defined above having a suction drum intended to maintain the web to be cut adhering thereto by sliding over its external surface, is that the section of the web or wrapper separated from the web, at a certain point in the cutting action, resists separation from the same when the as yet uncut section no longer slides with respect to the suction drum, and is completely held in adhesion to the same suction drum from which it has been drawn and is not severed by successive cuts along this latter severing section, the relative marginal edges being in an inclined discontinuous or irregularly jagged course, detrimental to the quality of the finished product.

OBJECTS OF THE INVENTION

The principal object of the present invention is to provide a device with contrarotating knives having cutting edges operating at different peripheral speeds at successive points with a shearing action by means of a succession of severing or cutting forces in an essentially tangential direction, which is able to operate at high speeds, in particular in automatic filter tipping machines.

Another object of the present invention, is to ensure that the operative angle of the contrarotating knives with cutting edges operating tangentially at successive points of contact, is situated astride the plane traversed by the axes of contrarotation in order to considerably reduce the course of the cutting edge of the knife inclined at the higher peripheral speed towards the cutting edge of the knife at the lower peripheral speed along the circumferential path of rotation of the said latter cutting edge.

Yet another object of the present invention is to reduce the operative angle and hence the time necessary for carrying out the severing of the wrappers.

A further object of the present invention is to allow both the sections of web or wrapper in the process of being cut or severed from the web and the web itself to adhere during the final cutting section without grazing the suction drum.

A further but not the ultimate aim of the present invention, finally, is to provide such an improved device which is extremely simple and consequently particularly functional, above all at the highest operative speeds, in the combination of the spacing drum for the cut wrappers and the drum for conveying the filter cigarette units for accurate successive transference by means of the tangential adherence of the said wrappers from the said distancing drum onto successive filter cigarette units in the automatic filter tipping machine.

SUMMARY OF THE INVENTION

These, and other objects of the present invention are attained in an automatic filter tipping machine operating at high speed comprising means for feeding the said web and two contrarotating drums with parallel axes and each provided with its respective series of equidistant knives with cutting edges designed to co-operate through tangential contact at successive points, the knives of one of the said series having a higher peripheral speed than that of the other series, and one of the said drums being provided with suction means designed to restrain the said web with its non-adhesive surface being fed between the cutting edges of the said knives, adhering to its external cylindrical surface in such a way as to allow the same drum to slide beneath the said web in order to keep it adhering to its said external surface and drawing it as a function of the feed speed of the same drum, both during the said feed phase and during the cutting phase, and on the other hand, maintaining stable the said wrappers which are successively severed from the web both by spacing them apart and successively applying them tangentially thus spaced apart by adherence of their adhesive surface to the abovementioned filter cigarette units, transported in likewise equidistant positions from a grooved drum of the said automatic filter tipping machine provided in contrarotating operative relation with the said drum.

This improved device is characterized in that the said series of knives with cutting edges having a greater peripheral speed is conveyed by the said drum provided with suction means, the said cutting edges substantially lying along the external cylinder defining the surface of the same support drum, and that the path of at least the cutting edges with a higher peripheral speed becomes higher in the direction of rotation in a plane lying tangential to the said support drum with its most downward and most upward sections respectively at a distance from the said axis of rotation with substantially equal radii and greater than that corresponding to the distance between the same axis of rotation of at least one of their intermediate points, the peripheral speed of the said cutting edges and of the external cylindrical surface of the said support drum having suction means being substantially equal to the tangential speed of the outermost peripheral point of the said filter cigarette units on the said grooved conveying drum and greater than the feed velocity of the web to be cut, which is to substantially equal to the peripheral speed of the cutting edges of the other series of the said knives, means being provided to allow the web and the wrappers in the process of being severed to be made adherent without sliding from the above mentioned suction drum during the final cutting section of the said wrappers from the said web.

The course of at least the abovementioned cutting edges with a higher peripheral speed becomes higher in the direction of their rotation in a corresponding plane lying tangential to the corresponding support drum may assume a somewhat convenient stable practical configuration, while retaining the known advantage which provides its lowermost and uppermost sections respectively at a distance from the said axis of roation with substantially equal radii and greater than that corresponding to the distance from the same axis of rotation by at least one intermediate point coinciding with the tangential point of the cutting edges of the two series of knives in the plane traversed by the axes of contrarotation of the same cutting edges of the said two series of knives.

BRIEF DESCRIPTION OF THE DRAWING

Further features and advantages of the present invention are found in the detailed description which follows, illustrated by way of example in the attached drawing, in which:

FIGS. 5–5A, 6–6A, 7–7A, 8–8A, 9, 10–10A are front and side views respectively according to the respective arrows of the same operative phases of the device in FIG. 1 adopting the detail in FIG. 2;

SPECIFIC DESCRIPTION

Figure 1:
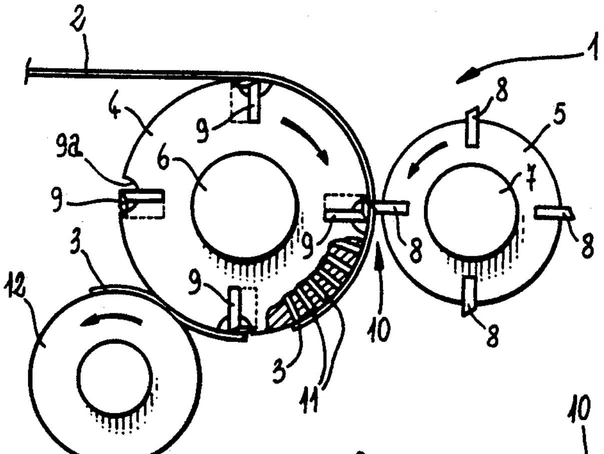
FIG. 1 is a side elevational view partly broken away, of a first embodiment of the device according to the present invention.

With reference to FIG. 1, 1 indicates a cutting device in its entirety, supported in a manner not shown by the base of an automatic filter tipping machine (not shown). Such a device 1 is designed to sever an adhesive coated web 2, into wrappers 3, designed to connect pairs of cigarettes aligned axially, between which is positioned a filter of double unit length.

The device 1 comprises two drums 4 and 5 substantially at a tangent to one another (left and right in FIG. 1), mounted on respective horizontal and parallel shafts 6 and 7. These shafts 6 and 7 are supported by the said base and are provided with rotary motors driven in opposite directions and at equal speeds by those motors. The drum 5, the peripheral speed of which is substantially equal to that of the advancement of the said web 2, has a smaller diameter than that of the drum 4, and supports four knives 8, substantially radial and uniformly distributed, provided with cutting edges generally parallel to the axis of the shaft 7 and projecting from the peripheral surface of the drum 5 itself (see also FIG. 2). The drum 4, of a larger diameter than the drum 5, and thus having a higher tangential speed than the feed speed of the web 2, has corresponding grooves 9*a* receiving four knives 9 uniformly positioned, their respective cutting edges being substantially rectilinear and oblique with respect to the axis of the shaft 6. The two drums 4 and 5 are dimensioned and adjusted on their respective axes in such a way that the respective knives 9 and 8 co-operate in succession, according to fixed combinations, corresponding to a zone, known as the cutting zone, indicated by 10.

A knife 8 and a knife 9, as a function of their reciprocal inclination and their different tangential speeds, come into contact in the said cutting zone 10 at one of their marginal positions. When the said knives 8 and 9, upon rotation of the drums 5 and 4, synchronize, they slide past one another, until they move apart at their second marginal position. From this it appears evident that the knives 9 and 8 on the drums 4 and 5 constitute, in pairs, proper and appropriate shearing means operating tangentially in succession, silently and with minimum wear, along the said cutting zone 10. It should be observed that the difference in peripheral speeds between the two knives 9 and 8 is such that the angular range of the drum 4 and 5 necessary to effect a cutting operation is restricted around the zone at a substantial tangent to the two drums 4 and 5 themselves.

In practice, the web 2 is fed continuously between the drums 4 and 5 and is drawn onto the cylindrical surface of the drum 4 via the suction means 11, of which only the end portion is shown in FIG. 1. Whenever the two knives 8 and 9 synchronize in the cutting zone 10, a wrapper 3 is detached from the web 2 by means of a progressive cut or cuts at successive points. The wrapper is moved away from the top of the web 2 by means of the greater peripheral speed of the drum 4, and its drawn over the surface of the latter by means of the said suction means 11 until it is fed to a utility zone illustrated in FIG. 1 by a drum labelled 12.

Figure 3:
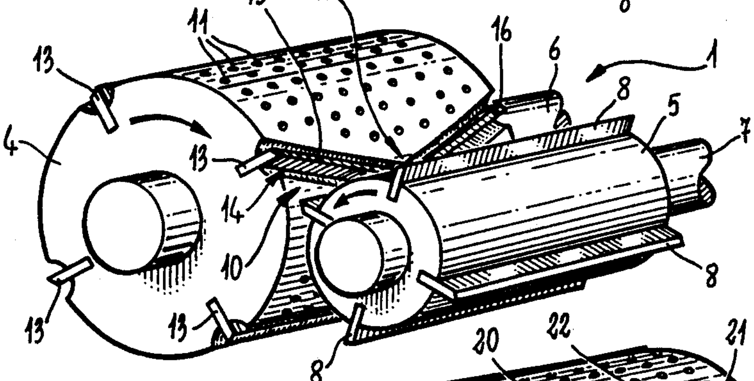
FIG. 3 shows a variation of the detail in FIG. 2 in perspective.

According to one embodiment of the device of the invention, represented in FIG. 3, the knives 9 in FIG. 1 are substituted by the knife 13, angled in a V, inserted in the groove 14. More precisely, the cutting profiles of such knives 13 are constituted by two converging sections 15 and 16, with regard to the sense of rotation of the drum 4, towards an intermediate vertex 17.

In this form of realization, the conditions of contact between the knives 13 and the corresponding knives 8, and thus the cutting of the web 2, is initiated at the vertex 17, in the central zone of the web 2, extending progressively upon rotation of the drums 4 and 5 towards the edges of the same.

Figure 4:
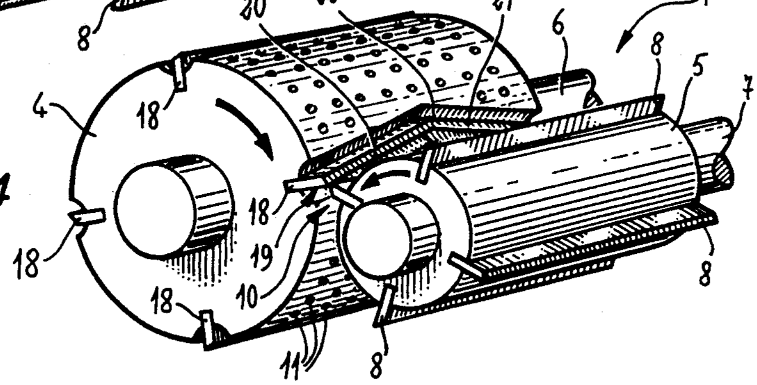
FIG. 4 shows another variation of the detail in FIG. 2 in perspective.

In accordance with another embodiment of the device in question, shown in FIG. 4, the knives 9 are substituted by knives 18 angled in a V inserted in grooves 19, the tangential profiles of which are formed by two diverging sections 20 and 21, with respect to the direction of rotation of the drum 4, from an intermediate vertex 22. In such a case, the cutting of the web 2 is initiated along boths its lateral edges and is completed in its middle zone.

Figure 18:
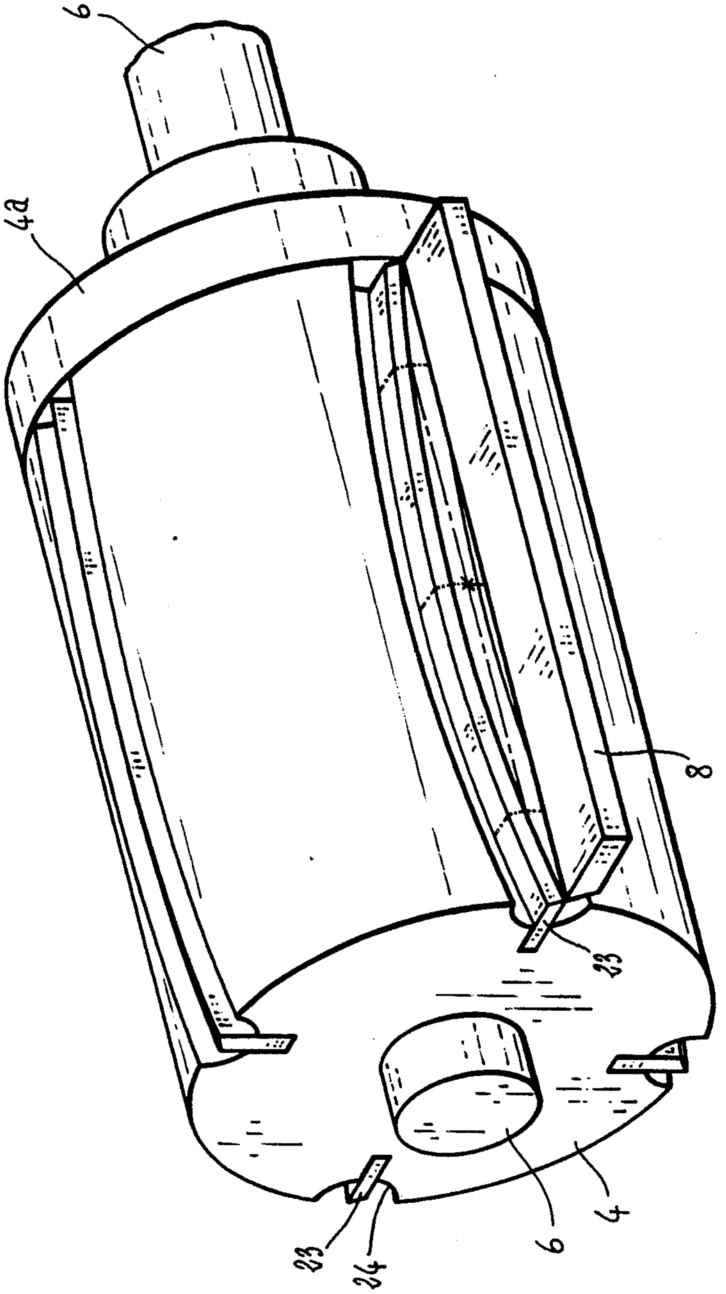
FIG. 18 shows in perspective on an enlarged scale a further embodiment of the detail in FIG. 2.

It should be noted that the sections 15 and 16, 20 and 21 of the knives 13 and 18, which in FIGS. 3 and 4 are rectilinear, may also be curved, and develop substantially over the external cylindrical surface of the drum, viz. the knives 23 in FIG. 18.

The angling of the knives 13 and 18 and the curve of the knives 23 in FIGS. 3, 4 and 18 may also be obtained by means of the forced insertion of flat knives within the grooves 14, 19 and 24 of the drums 4.

In accordance with another embodiment of the invention not shown, the knives 13 and 18 may be substituted by individual cut-down angled flat knives, the respective cutting profiles of which are made up of two coplanar sections converging into a vertex.

It should also be noted that while retaining the principal structures and operative forms of embodiment examined, the described knives 13 and 18 may have more than one vertex 17, 22, or in other words, may be jagged.

It seems evident that the solutions shown in FIGS. 3, 4 and 18 may be considered particularly advantageous, in that they avoid, owing to the fact that the cutting of the wrappers 3 is completed simultaneously at its two lateral edges (FIG. 3) or respectively at its intermediate zone (FIGS. 4 and 18), the problem whereby the wrappers 3, when the cutting is almost finished, tend to rotate around the short uncut lateral section which still connects them to the web 2, under the drawing action of the drum 4 which tends to detach them from the web 2 itself.

Of course, while retaining the main principle of the invention, consisting in providing at least the cutting edges with a higher coplanar peripheral velocity, becoming higher in the direction of rotation with their lowermost and uppermost parts respectively at a distance from the axis of rotation substantially equal to radii and greater than that corresponding to the distance from the said axis of rotation, of at least one of their intermediate points coincident with the tangential point of the cutting edges of both series of knives in the plane traversed by the axes of contrarotation of the same cutting edges of both the said series of knives, the modifications which may be made to the device described above without straying from the aim of the present invention are numerous.

For example, the number of knives 9,13,18 and 23 may be different from that of the knives 8, and the angular speeds of the shafts 6 and 7 do not necessarily have to be equal.

The peripheral velocity of the drum 5 may also differ from that at which the said feed means restrain the web 2, and the said knives 8 may be exchanged onto the drums 4 and 5 for the said knives 9,13,18 and 23.

In accordance with a final embodiment not shown of the present invention, astride the drums 4 and 5 are supported knives analogous to the said knives 9,13,18 and 23 having cutting edges shaped in such a way as to guarantee a correct progressive tangential pairing between corresponding knives in the course of each cutting operation.

Figure 2:
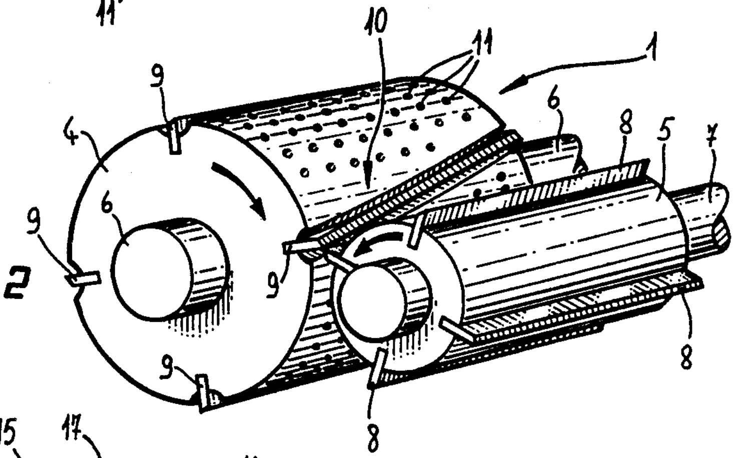
FIG. 2 shows a detail of FIG. 1 on a larger scale and in perspective.
Figure 16:
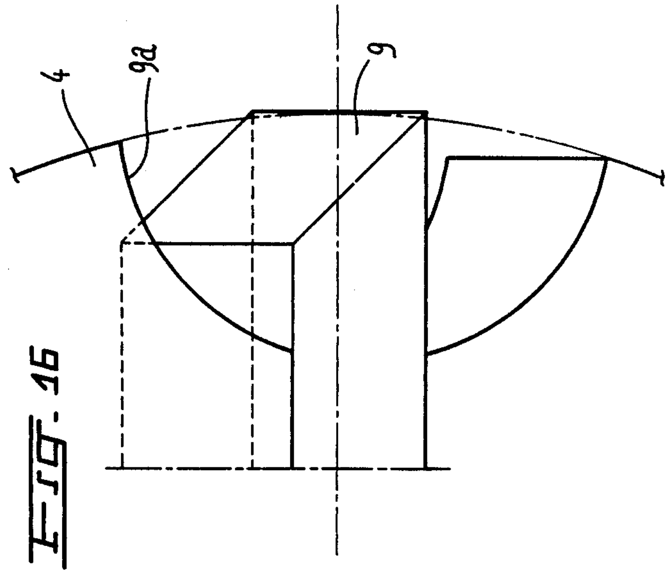
FIG. 16 shows one of the cutting knives on its corresponding drum on an enlarged scale.

In all the abovementioned embodiments, severing of the wrappers 3 from the web 2 occurs in the manner shown at strictly successive moments of contrarotation of the drums 4 and 5 in the Figures from 5 to 10 and 17, in which the said drums 4 and 5 are provided with cutting blades of the type already described with reference to FIGS. 1 and 2 and indicated by 9 and 8 respectively. As has already been stated, the said knives 9, see FIGS. 11–15 and in particular FIG. 16, are arranged obliquely with respect to the axis of rotation of the corresponding drum 4 and their respective cutting edges lie in a plane tangential to the said drum 4 so as to become higher with regard to the direction of rotation of the same drum 4 with their respective opposite lowermost and uppermost marginal edges respectively at a distance from the axis of rotation, with substantially equal radii and greater than that corresponding to the distance from the said axis of rotation, with their middle point coinciding with the tangential proint of the cutting edges of both series of knives 8 and 9 in the plane traversed by the axes of contrarotation of the corresponding abovementioned drums 5 and 4.

Figure 5A:
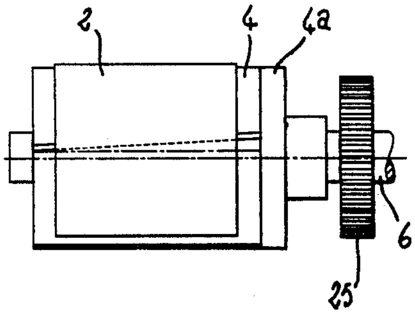
Figure 5:
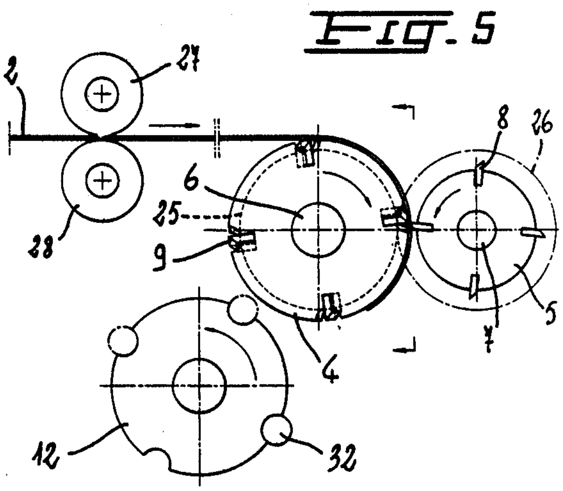
Figure 6A:
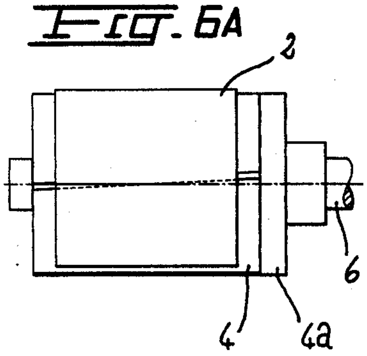
Figure 6:
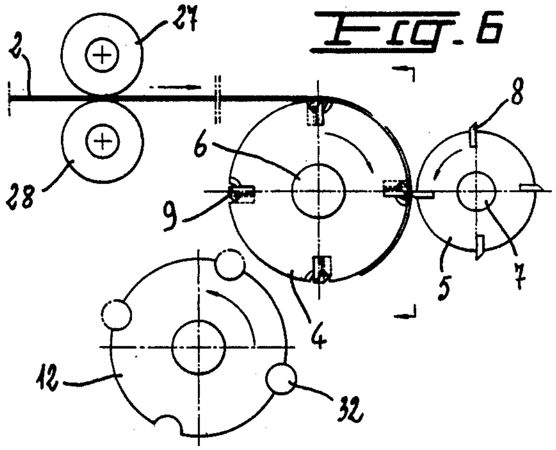
Figure 7A:
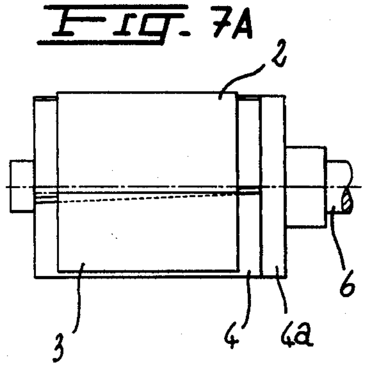
Figure 7:
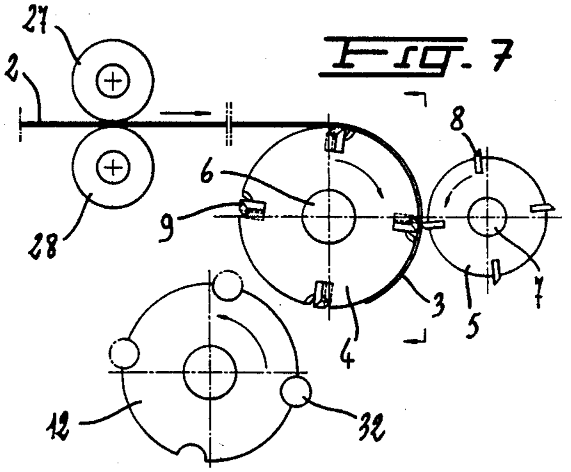
Figure 11:
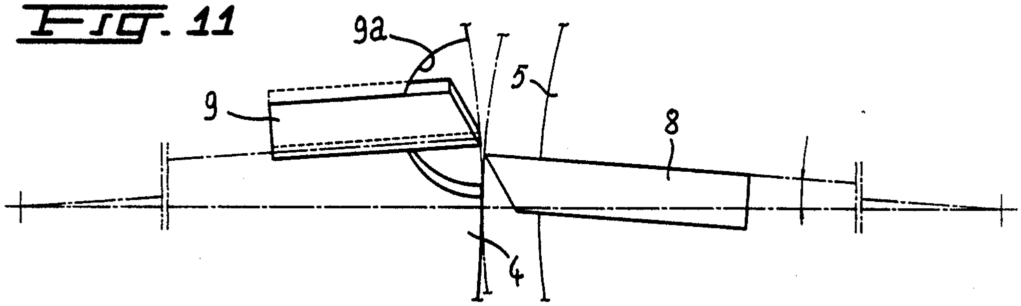
FIGS. 11–15 show a corresponding number of operative positions of the cutting knives as those in the embodiment in FIG. 2.
Figure 12:
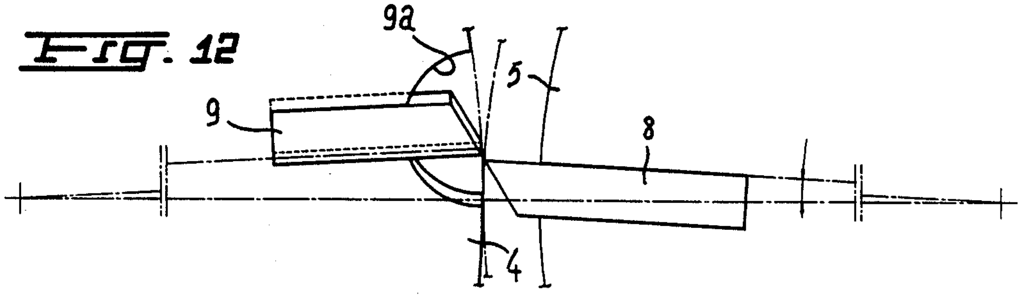
Figure 13:
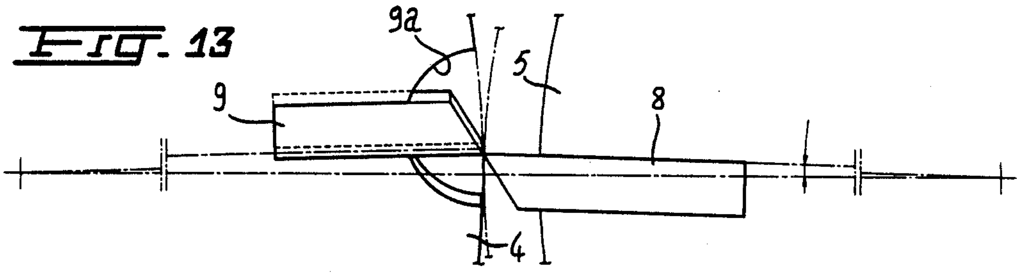
Figure 14:
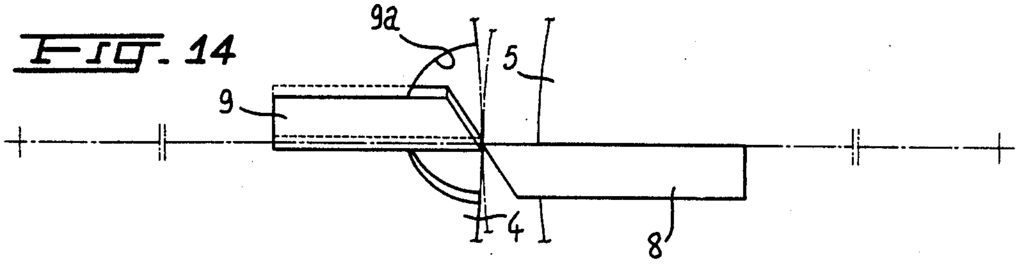
Figure 15:
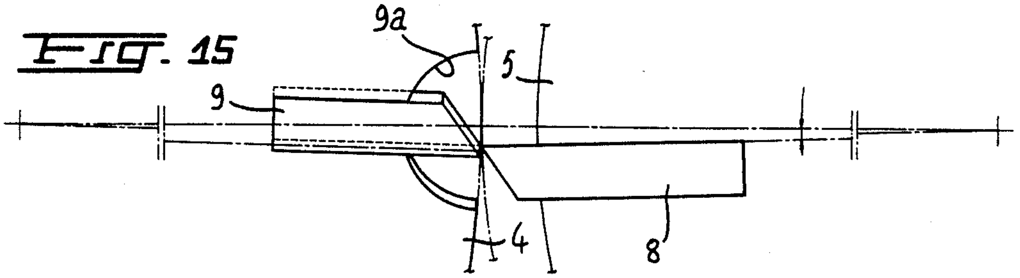
Figure 17:
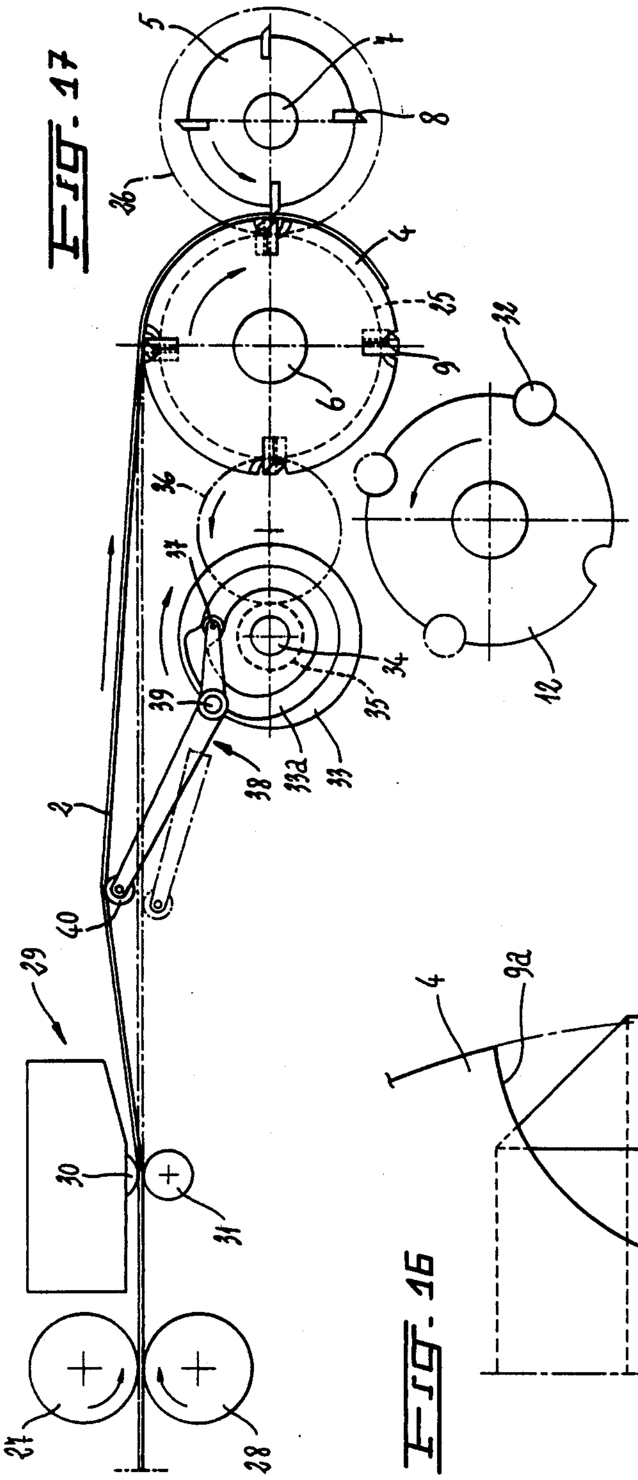
FIG. 17 shows diagramatically a detail concerning feeding from the web to be cut.

From FIG. 5, it can be seen that these drums 4 and 5 are coupled in a contrarotating relationship by means of gears or toothed wheels of equal diameter 25 and 26 mounted on their respective shafts 6 and 7 and forming a kinematic linkage for driving the automatic filter tipping machine while in particular in FIG. 17, it can be seen that the continuous feeding from the web to be severed 2 is carried out in the conventional manner across a pair of drawing drums 27 and 28, also deriving their contrarotating movement from the said kinematic action of the automatic filter tipping machine. The said web 2 to be cut, before arriving between the cutting knife-carrying drums 4 and 5, passes over an adhesive device of the conventional type indicated by the number 29 on the adhesive applying drum 30 and the counter drum 31 by the adhesion of one of its surfaces enabling cut pieces 3 to come into contact with the filter cigarette units 32.

In the same Figures from 5 to 10, and in particular FIGS. 8 and 8*a*, the conventional structure of the suction drum 4 can also be seen with its association fixed distributing disc 4*a* to which is connected one end of a tube or pipe 4*b* forming the head with the other of its edges of a conventional suction source not shown.

FIGS. 5–5A and 7–7A show the phase relation between the two series of knives 8 and 9 in tangential co-operation at the beginning, at the middle and at the end of the severing of the first wrapper 3 from the web 2, while FIGS. 8–8A and 10–10A show the said knives in position, two, midway between the cutting of one wrapper and the next, and the third respectively at the end of cutting a second wrapper 3.

As has already been stated, in the cutting devices, hitherto known with suction devices, the web to be cut tends to adhere to the suction device by sliding over its external area with the result that at a certain point in its final section of the cutting action, the wrapper in the process of being severed from the web no longer slides, becoming completely adherent to the said external surface of the corresponding drum from which it is going to be cut and is torn with successive tears along the section still to be cut forming edge sections in an inclined and discontinuous or irregular course, detrimental to the quality of the finished product.

In order to also eliminate this disadvantage, the present invention provides a device of the eccentric type to intervene in the section of the web 2 during the feeding between the drums 4 and 5 and the adhesive device 29 (see FIG. 17). The said eccentric device comprises a disc 33 with a relief activating cam 33*a* mounted on a shaft 34 maintained horizontal by the base of the automatic filter tipping machine. A gear 35 is also mounted on the shaft 34 in contact with a gear 36 supported in idle and in turn is in contact with the gear 25 mounted on shaft 6 of the knife carrying drum 4. The gear 35 is provided in contact from 1 to 4 with the gear 25. A cam roller 37 is engaged in the relief cam 33*a* carried in idle at the free end of one of the arms of a two-armed lever 38 carried in idle on a shaft 39 also supported by the base of the automatic filter tipping machine. An idling roller 40 is carried by the free end of the other arm of the said two-armed lever 38 designed to operate on the lower non-adhesive side of the web 2. The said relief cam 33*a* is provided with a shape so as to cause the said two-armed lever 38 to oscillate during the final cutting operation of the wrappers 3 from the web 2 so as to also allow the said web 2 to be drawn but without sliding on the suction drum 4.

I claim:

1. An apparatus for cutting pieces from a web of flexible material which comprises:

a first drum provided with a cylindrical suction surface for drawing material of said web thereagainst but able to slide relative to said material while maintaining said material adherent thereto, said first drum being provided with an array of angularly equispaced knives having edges lying along a cylinder corresponding substantially to said surface of said drum and generally along respective generatrices thereof but with an inclination to a respective generatrix and adapted to lie in a tangent plane whereby one portion of each knife is located lower than another portion of the same knife edge, the one portion and the other portion of each knife edge being radially spaced equidistantly from the axis of said drum by a greater distance than a radial spacing of an intermediate portion of the respective knife edge from said axis;

a second drum juxtaposed with the first drum and provided with an array of knives angularly equispaced on said second drum and projecting outwardly beyond a surface of said second drum, the knives of said second drum lying generally along generatrices thereof with edges passing into said tangent plane, said drums having axes of rotation lying in a common axial plane perpendicular to said tangent plane said knives of said second drum having edges lying along another cylinder, said cylinders being tangent to one another; and means for rotating said drums in opposite senses and said first drum with a greater peripheral speed than said second drum such that the knives of the two drums meet in a shearing action at said tangent plane to commence cutting said material at one side of said axial plane and continue cutting said material as the meeting knives pass through said axial plane, a cut piece of said material thus formed being retained by suction against the surface of said first drum while said surface slips relative to the remainder of said web, said intermediate portion of the respective knife edge of said first drum coincides with a tangential point of the edges of both arrays of knives in said tangent plane.

2. The apparatus defined in claim 1 wherein said edges of said knives of said first drum are curved in said tangent plane.

3. The apparatus defined in claim 1 wherein said knives of said first drum have a V-shape with a vertex at the center of said first drum.

4. The apparatus defined in claim 3 wherein said vertex is convergent downwardly.

5. The apparatus defined in claim 3 wherein said vertex is convergent upwardly.

6. The apparatus defined in claim 1 wherein the knives of said first drum are oblique end extend continuously in a single oblique path from one end of said first to the opposite end of said first drum.

7. The apparatus defined in claim 1, further comprising means for engaging said web upstream of said first drum and deflecting same and means synchronized with said first drum for relaxing the reflection of said web, enable said web to briefly entrain with said first drum at the peripheral speed thereof.

* * * * *